United States Patent
Hayashi et al.

(10) Patent No.: US 12,463,069 B2
(45) Date of Patent: Nov. 4, 2025

(54) WAFER TEMPERATURE CONTROL DEVICE, WAFER TEMPERATURE CONTROL METHOD, AND WAFER TEMPERATURE CONTROL PROGRAM

(71) Applicant: HORIBA STEC, Co., Ltd., Kyoto (JP)

(72) Inventors: Daisuke Hayashi, Kyoto (JP); Kotaro Takijiri, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 112 days.

(21) Appl. No.: 18/484,626

(22) Filed: Oct. 11, 2023

(65) Prior Publication Data
US 2024/0136212 A1  Apr. 25, 2024
US 2024/0234186 A9  Jul. 11, 2024

(30) Foreign Application Priority Data

Oct. 21, 2022 (JP) ................. 2022-169033

(51) Int. Cl.
*H01L 21/67* (2006.01)
*G05D 23/19* (2006.01)

(52) U.S. Cl.
CPC ... *H01L 21/67248* (2013.01); *G05D 23/1919* (2013.01); *H01L 21/67103* (2013.01)

(58) Field of Classification Search
CPC ........ H01L 21/67248; H01L 21/67103; G05D 23/1919
See application file for complete search history.

(56) References Cited

U.S. PATENT DOCUMENTS

2002/0048311 A1* 4/2002 Norrbakhsh ...... H01L 21/67248
374/161

FOREIGN PATENT DOCUMENTS

| JP | H11507473 A | 6/1999 |
|---|---|---|
| JP | 2000277237 A | 10/2000 |
| JP | 4034344 B2 | 1/2008 |
| JP | 2011135097 A | 7/2011 |

(Continued)

OTHER PUBLICATIONS

Japan Patent Office, Office Action Issued in Application No. 2022169033, Aug. 19, 2025, 9 pages.

*Primary Examiner* — Eric S Ruppert
(74) *Attorney, Agent, or Firm* — Alleman Hall & Tuttle LLP (57) ABSTRACT

The present invention is a wafer temperature control device for controlling the temperature of a wafer by regulating the pressure of a heat transfer gas, the wafer temperature control device being capable of estimating the temperature of the wafer with sufficient accuracy and controlling the temperature of the wafer to a target temperature, and including: a pressure regulator configured to regulate the pressure of the heat transfer gas; a nearby temperature sensor configured to measure a nearby temperature of the wafer, a temperature estimation observer configured to estimate the temperature of the wafer based on the nearby temperature measured by the nearby temperature sensor and a manipulated pressure variable input to the pressure regulator or the pressure regulated by the pressure regulator, and a controller configured to control the manipulated pressure variable based on a temperature setting and an estimated wafer temperature estimated by the temperature estimation observer.

8 Claims, 9 Drawing Sheets

(56) References Cited

FOREIGN PATENT DOCUMENTS

| | | |
|---|---|---|
| JP | 2021019066 A | 2/2021 |
| JP | 2021521640 A | 8/2021 |
| WO | 9641369 A1 | 12/1996 |
| WO | 2019199641 A1 | 10/2019 |

* cited by examiner

$$\begin{cases} \dfrac{d}{dt}T_w = -\dfrac{(S_w+S_{ws})\alpha_A}{C_w}T_w + \dfrac{S_w\alpha}{C_w}(T_p-T_w) + \dfrac{\gamma p}{C_w}q + \dfrac{\delta q}{C_w} \\ \dfrac{d}{dt}T_p = -\dfrac{S_{ps}\alpha_A}{C_p}T_p + \dfrac{S_w\alpha}{C_p}(T_w-T_p) + \dfrac{S_w\beta}{C_p}(T_c-T_p) + \dfrac{1-(\gamma+\eta)p}{C_p}q \end{cases}$$

■ EQUATION OF STATE $$A = \begin{pmatrix} -\dfrac{(S_w+S_{ws})\alpha_A + S_w\alpha}{C_w} & \dfrac{S_w\alpha}{C_w} \\ \dfrac{S_w\alpha}{C_p} & -\dfrac{S_{ps}\alpha_A + S_w\alpha + S_w\beta}{C_p} \end{pmatrix}$$

$$B_0 = \begin{pmatrix} \dfrac{1}{C_w} \\ -\dfrac{1}{C_p} \end{pmatrix} \quad B_1 = \begin{pmatrix} \dfrac{1}{C_w} \\ 0 \end{pmatrix} \quad B_2 = \begin{pmatrix} 0 \\ \dfrac{1}{C_p} \end{pmatrix}$$

$$x = \begin{pmatrix} T_w \\ T_p \end{pmatrix}$$

$$u_0 = \gamma p q$$
$$d_1 = \delta q$$
$$s_2 = q + S_w \beta T_c$$

$$\boxed{\dot{x} = Ax + B_0 u_0 + B_1 d_1 + B_2 s_2}$$

FIG.5

- $\alpha_A, \alpha, \beta$: Heat transfer rates (W/m²K)
- $\gamma, \eta$: Power distribution rates (Torr⁻¹)

(a) EXAMPLE OF OBSERVER CONTROL USING UNCORRECTED TEMPERATURE SETTING $T_{SET}$

FIG.8A (b) EXAMPLE OF OBSERVER CONTROL USING CORRECTED TEMPERATURE SETTING $T_{SET}'$

WAFER TEMPERATURE CONTROL DEVICE, WAFER TEMPERATURE CONTROL METHOD, AND WAFER TEMPERATURE CONTROL PROGRAM

BACKGROUND OF THE INVENTION

1. Technical Field

The present invention relates to a wafer temperature control device, a wafer temperature control method, and a wafer temperature control program.

2. Description of the Related Art

Conventionally, in a semiconductor manufacturing process such as a deposition, a wafer to be processed is placed on a plate such as an electrostatic chuck. At this time, the temperature of the plate such as the electrostatic chuck is regulated, in order to control the temperature of the wafer to a predetermined target temperature.

Because the plate on which the wafer is placed is disposed in a low-pressure environment, such as vacuum, there has been an idea for promoting the transfer of heat from the plate being subjected to the temperature adjustment to the wafer by supplying a heat transfer gas, such as helium gas, between the plate and the wafer, as disclosed in JP 4034344 B.

Because the heat transfer coefficient changes depending on the pressure of the heat transfer gas supplied between the plate and the wafer, it is necessary to regulate the pressure of the heat transfer gas.

However, even if the pressure of the heat transfer gas is regulated, it has been difficult to measure the temperature of the wafer itself placed on the plate, due to various technical restrictions.

As disclosed in JP 2021-19066 A, there has been a temperature control device for measuring the temperature near the wafer, by providing a temperature sensor on a stage, and using an observer to estimate the temperature of an electronic device provided on the wafer.

However, this kind of temperature control device is neither originally designed to be used for a device configured to supply heat transfer gas between the stage and the wafer, nor the observer includes the pressure of the heat transfer gas as an input variable. Hence, it is difficult to estimate the wafer temperature with sufficient accuracy, and control the wafer to a constant target temperature.

PRIOR ART DOCUMENT

Patent Document

JP 4034344 B
JP 2021-19066 A

SUMMARY OF THE INVENTION

The present invention has been made to solve the problem described above, and an object of the present invention is to enable an estimation of a wafer temperature with sufficient accuracy, and to control the wafer temperature to a target temperature, in a device configured to control the wafer temperature by regulating the pressure of heat transfer gas.

In other words, a wafer temperature control device according to the present invention is a wafer temperature control device in which a wafer is placed on a plate having a temperature regulated, and that controls a temperature of the wafer by supplying a heat transfer gas between the plate and the wafer, the wafer temperature control device including: a pressure regulator configured to regulate a pressure of the heat transfer gas; a nearby temperature sensor configured to measure a temperature near the wafer; a temperature estimation observer configured to estimate the temperature of the wafer based on a nearby temperature measured by the nearby temperature sensor, and a manipulated pressure variable input to the pressure regulator or a pressure regulated by the pressure regulator; and a controller that controls the manipulated pressure variable based on a temperature setting for the wafer and an estimated wafer temperature estimated by the temperature estimation observer.

In such a wafer temperature control device, the temperature of the wafer is estimated using the temperature estimation observer that uses the pressure of the heat transfer gas as an input variable, and the temperature of the wafer can be estimated with sufficient accuracy. Additionally, the manipulated pressure variable to be input to the pressure regulator configured to regulate the pressure of the heat transfer gas is controlled based on the temperature setting for the wafer and the estimated wafer temperature estimated by the temperature estimation observer. Therefore, the wafer temperature can be controlled to the target temperature highly accurately.

It is conceivable to control a manipulated cooling variable or a manipulated heating variable input to a cooler or a heater for regulating the plate temperature. With these approaches, however, it is difficult to fine-tune the wafer temperature. It is easier to control the manipulated pressure variable input to the pressure regulator, as in the present invention.

The nearby temperature herein is, for example, a temperature of a member or a space within a predetermined distance with respect to the wafer, and includes a temperature by which a temperature model representing a relationship between the wafer temperature and the nearby temperature can be constructed. The nearby temperature also includes a temperature of a member in direct contact with the wafer, a temperature of a space or gas sharing an interface with the wafer, or a temperature of a member disposed with a gap of several μm with respect to the wafer W. The nearby temperature may also include a temperature of a member capable of conducting or transferring heat to the wafer by means of at least one of conduction, convection, or radiation.

In order to enable wafer temperature estimation with a simple system, it is conceivable to use a temperature estimation observer that uses a state-space model in which the relationship between the wafer temperature and the pressure of the heat transfer gas is linear.

However, the wafer temperature and the pressure of the heat transfer gas in the actual environment have a non-linear relationship, so that the estimated wafer temperature estimated by the temperature estimation observer includes some error with respect to the wafer temperature. Hence, it is difficult for such a temperature estimation observer to control the wafer temperature accurately to the target temperature.

In order to suitably solve this problem, preferably, the controller is configured to correct the temperature setting using a non-linear relationship between the temperature of the wafer and the pressure of the heat transfer gas acquired in advance, and control the manipulated pressure variable so as to reduce a temperature deviation between a corrected temperature setting and the estimated wafer temperature.

As a specific embodiment for correcting the temperature setting for the wafer using the non-linear relationship between the temperature of the wafer and the pressure of the heat transfer gas acquired in advance, the controller may include a relationship data storage unit that stores therein non-linear relationship data indicating a non-linear relationship between the temperature of the wafer and the pressure of the heat transfer gas, the non-linear relationship being acquired in advance, and linear relationship data indicating a linear relationship between the temperature of the wafer and the pressure of the heat transfer gas, the linear relationship being used in the state-space model of the temperature estimation observer, and the controller may be configured to obtain a converted pressure non-linearly corresponding to the temperature setting, from the temperature setting and the non-linear relationship data, to obtain a converted temperature linearly corresponding to the converted pressure, from the converted pressure and the linear relationship data, and to use the converted temperature as the corrected temperature setting.

In order to improve the estimation accuracy of the estimated wafer temperature by correcting an estimation error in the estimated wafer temperature caused by inaccuracy in the initial temperature, preferably, the temperature estimation observer includes: a temperature estimation model that is a linear state-space model having a temperature of the wafer and a nearby temperature as output variables; a nearby temperature output unit configured to output the estimated nearby temperature estimated based on the temperature estimation model; a wafer temperature output unit configured to output an estimated wafer temperature estimated based on the temperature estimation model; and an observer gain, and the temperature estimation model is configured to receive a value obtained by multiplying the observer gain to a deviation between the estimated nearby temperature output from the nearby temperature output unit and the nearby temperature measured by the nearby temperature sensor, or to a value calculated from the deviation, as a feedback.

In addition, in order to improve the estimation accuracy of the estimated wafer temperature by considering the nonlinearity of the temperature of the plate, the temperature estimation observer preferably includes: a temperature estimation model that is a linear state-space model having a temperature of the wafer and a nearby temperature as output variables; a nearby temperature output unit configured to output an estimated nearby temperature estimated based on the temperature estimation model; a nearby temperature correction unit that corrects the estimated nearby temperature output from the nearby temperature output unit, considering a nonlinear characteristic of the temperature of the plate; a wafer temperature output unit configured to output an estimated wafer temperature estimated based on the temperature estimation model; and an observer gain, in which the temperature estimation model is configured to receive a value obtained by multiplying the observer gain to a deviation between the corrected estimated nearby temperature output from the nearby temperature correction unit and the nearby temperature measured by the nearby temperature sensor, or to a value calculated from the deviation, as a feedback.

In order to facilitate maintaining the wafer at a constant temperature while simplifying control input, it is conceivable to set the manipulated cooling or heating variable input to the cooler or the heater for regulating the temperature of the plate as a constant value. In this case, the temperature estimation observer preferably includes a temperature estimation model corresponding to the temperature of the plate having the temperature regulated.

Furthermore, a wafer temperature control method according to the present invention is a wafer temperature control method for controlling a temperature of a wafer by placing the wafer on a plate having a temperature regulated and supplying a heat transfer gas between the plate and the wafer, the method including: causing a pressure regulator to regulate a pressure of the heat transfer gas; causing a nearby temperature sensor to measure a temperature near the wafer; causing a temperature estimation observer to estimate the temperature of the wafer based on a nearby temperature measured by the nearby temperature sensor and a manipulated pressure variable input to the pressure regulator or a pressure regulated by the pressure regulator; and controlling the manipulated pressure variable based on a temperature setting for the wafer and an estimated wafer temperature estimated by the temperature estimation observer.

Furthermore, a wafer temperature control program according to the present invention is a wafer temperature control program to be used in a wafer temperature control device in which a wafer is placed on a plate having a temperature regulated, and that controls a temperature of the wafer by supplying a heat transfer gas between the plate and the wafer, the wafer temperature control device including a pressure regulator configured to regulate a pressure of a heat transfer gas; and a nearby temperature sensor configured to measure a nearby temperature of a wafer, and in which the wafer is placed on a plate having a temperature regulated, and the wafer temperature control program providing a computer with functions of: a temperature estimation observer configured to estimate a temperature of the wafer based on a nearby temperature measured by the nearby temperature sensor and a manipulated pressure variable input to the pressure regulator or a pressure regulated by the pressure regulator; and a function as a controller configured to control the manipulated pressure variable based on a temperature setting for the wafer and an estimated wafer temperature estimated by the temperature estimation observer.

The wafer temperature control program may be electronically distributed or recorded in a program recording medium such as a CD, a DVD, or a flash memory.

The present invention described above may have an embodiment in which the temperature setting for the wafer is corrected using a non-linear relationship between the temperature of the wafer and the pressure of the heat transfer gas, but may also have an embodiment in which the temperature setting for the wafer is corrected using a non-linear relationship between the temperature of the wafer and the temperature of the temperature regulator. In other words, a wafer temperature control device according to the present invention includes: a temperature regulator configured to regulate a temperature of a wafer according to an input manipulated temperature variable; a nearby temperature sensor configured to measure a nearby temperature of the wafer; a temperature estimation observer configured to estimate the temperature of the wafer based on the nearby temperature measured by the nearby temperature sensor and the manipulated temperature variable input to the temperature regulator or a temperature of the temperature regulator; and a controller configured to control the manipulated temperature variable based on a temperature setting for the wafer and the estimated wafer temperature estimated by the temperature estimation observer, in which the temperature estimation observer is configured to use a state-space model in which the temperature of the wafer and the temperature of the temperature regulator has a linear relationship, the controller is configured to correct the temperature setting using a non-linear relationship between the temperature of the wafer and the temperature of the temperature regulator, the non-linear relationship having been acquired in advance, and to control the temperature manipulated variable so as to reduce a temperature deviation between a corrected temperature setting and the estimated wafer temperature.

As described above, according to the present invention, it is possible to estimate a wafer temperature with sufficient accuracy, and to control the wafer temperature to a target temperature, in a device configured to control the wafer temperature by regulating the pressure of heat transfer gas.

DETAILED DESCRIPTION

One Embodiment of Present Invention

An embodiment of a wafer temperature control device according to the present invention will now be explained with reference to some drawings. Note that all of the drawings described below are schematic representations with some omissions and exaggerations made as appropriate, in order to facilitate understanding. The same elements are denoted by the same reference numerals, and the descriptions thereof will be omitted as appropriate.

A wafer temperature control device 100 according to this embodiment is used for a semiconductor manufacturing apparatus that performs a semiconductor manufacturing process such as a deposition, and is configured to electrostatically chuck the back surface of the wafer W in a vacuum chamber, for example.

Figure 1:
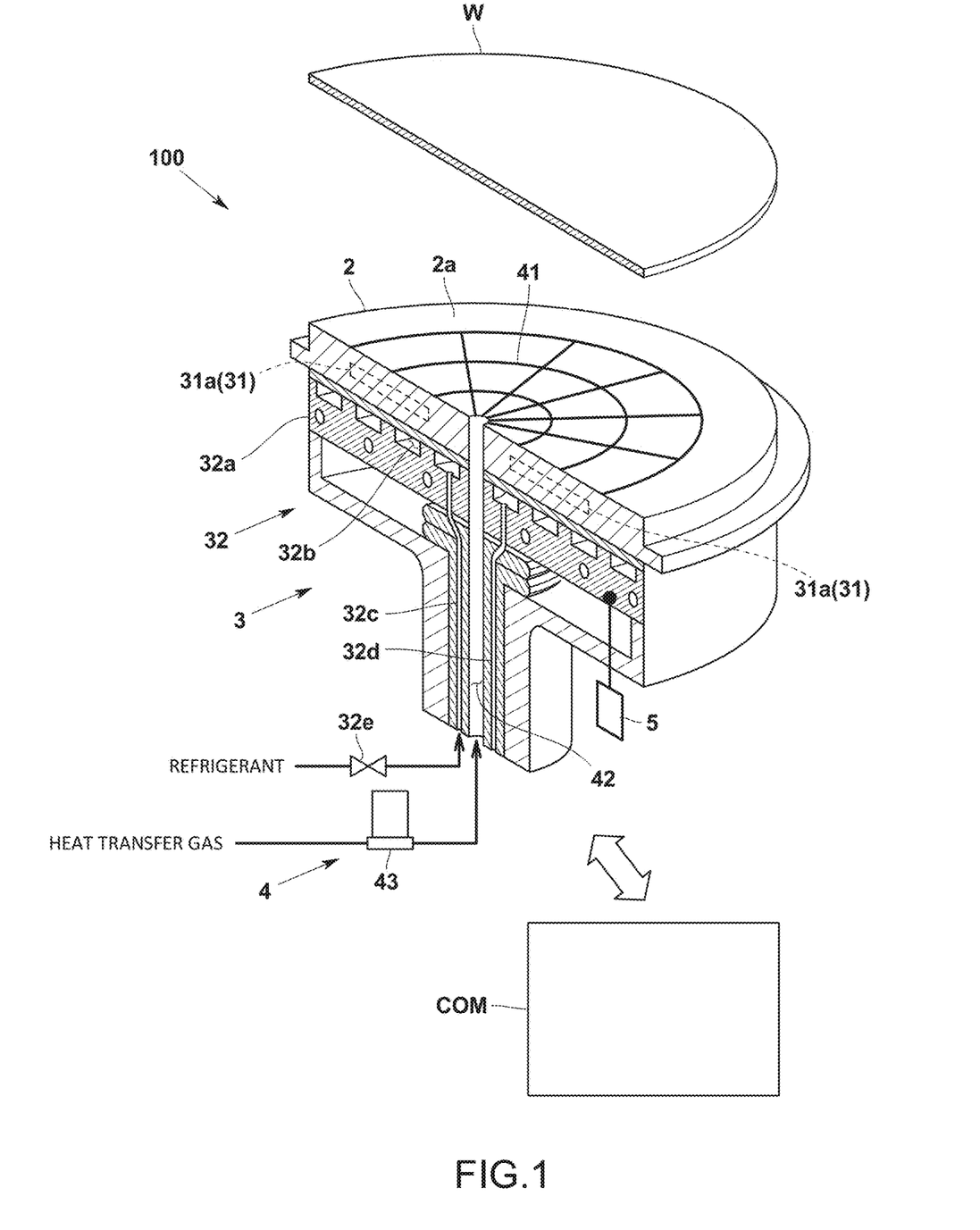
FIG. 1 is a diagram schematically illustrating a configuration of a wafer temperature control device according to an embodiment of the present invention.

Specifically, as illustrated in FIG. 1, the wafer temperature control device 100 includes a suction plate 2 on which the wafer W is placed, and a temperature regulator 3 configured to regulate the temperature of the suction plate 2.

The suction plate 2 forms a part of what is called an electrostatic chuck that holds the wafer W with electrostatic attractive force. The suction plate 2 according to this embodiment is a substantially disk-shaped ceramic plate, and an upper surface thereof serves as a suction surface 2a that sucks the wafer W. An electrostatic electrode (not illustrated) for generating electrostatic force between the suction plate 2 and the wafer W is provided inside the suction plate 2.

The temperature regulator 3 regulates the temperature of the suction plate 2 to a preset temperature, and includes a heater 31 that heats the suction plate 2 and a cooler 32 that cools the suction plate 2. It is also possible for the temperature regulator 3 not to include the heater 31.

The heater 31 is provided inside the suction plate 2, and has a plurality of heater electrodes 31a for heating the suction plate 2. Power supplied to the plurality of heater electrodes 31a is controlled by a heating control unit (not illustrated) in a control device COM, and the plurality of heater electrodes 31a are independently controlled in accordance with a manipulated heating variable set by a user.

The cooler 32 is provided in contact with the bottom surface of the suction plate 2, and includes a base plate 32a having a substantially disk-like shape, and a cooling channel 32b formed inside the base plate 32a.

The cooling channel 32b has a spiral shape inside the base plate 32a, in a plan view. A feed channel 32c and a discharge channel 32d connected to a cooling source (not illustrated), such as a chiller, are connected to the cooling channel 32b. A control valve 32e that controls the flow rate of the refrigerant is provided in the channel connected to the cooling channel 32b, and a valve control unit (not illustrated) in the control device COM controls the degree by which the control valve 32e is opened.

The wafer temperature control device 100 according to this embodiment includes a gas feed mechanism 4 that feeds a heat transfer gas such as helium gas or argon gas between the suction plate 2 and the wafer W.

The gas feed mechanism 4 feeds the heat transfer gas having a predetermined pressure between the suction surface 2a of the suction plate 2 and the back surface of the wafer W being suctioned.

Specifically, the gas feed mechanism 4 includes a gas circulation groove 41 formed on a suction surface 2a of the suction plate 2, a gas feed line 42 for supplying the heat transfer gas into the gas circulation groove 41, and a pressure regulator 43 for regulating the pressure of the heat transfer gas supplied to the gas circulation groove 41. The heat transfer gas supplied to the gas circulation groove 41 flows from the gas circulation groove 41 into the space between the suction surface 2a of the suction plate 2 and the back surface of the wafer W being suctioned.

The gas circulation groove 41 includes, for example, a plurality of linear grooves formed radially from the central axis of the suction plate 2 and a plurality of circular grooves formed in a circular shape from the central axis of the suction plate 2. The gas feed line 42 extends along the central axis of the suction plate 2 and is connected to a heat transfer gas source (not illustrated).

Figure 2:
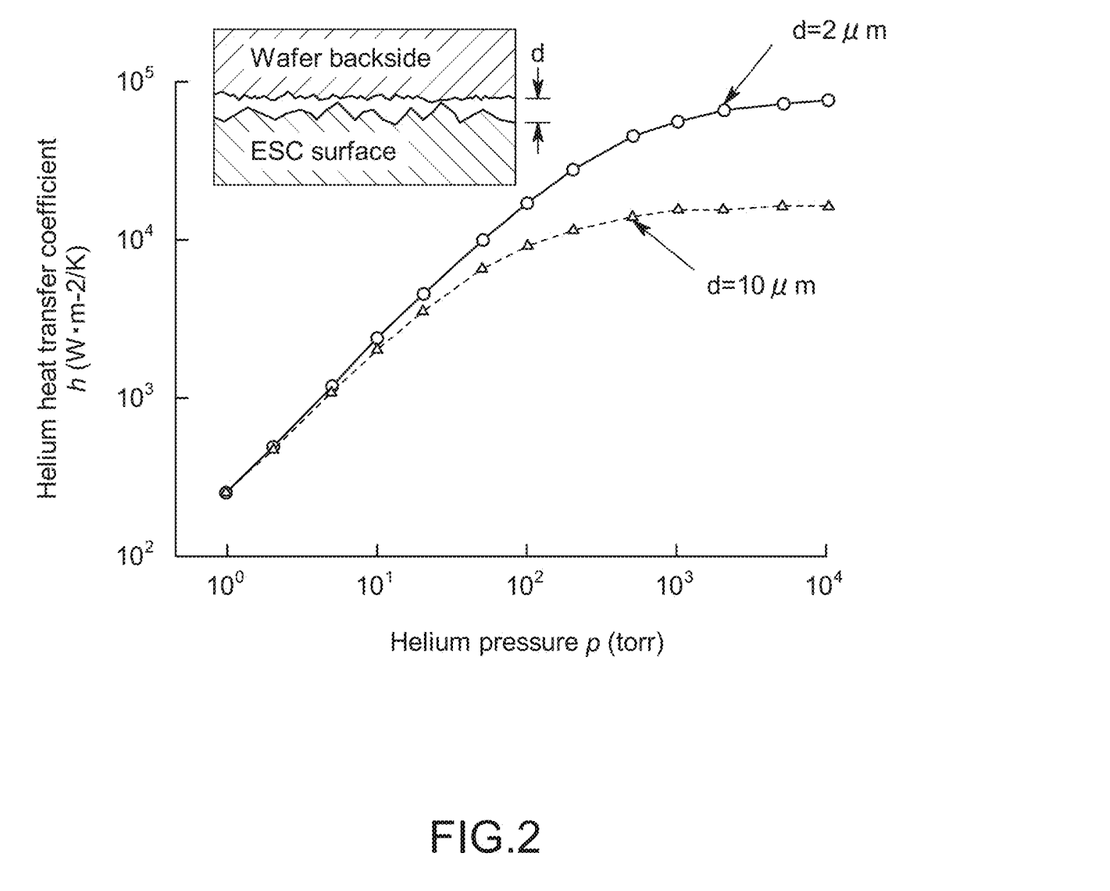
FIG. 2 is a diagram illustrating a relationship between a pressure of a heat transfer gas supplied between a wafer and a suction plate, and a heat transfer coefficient of heat transfer between the wafer and the suction plate.

The pressure regulator 43 can change the heat transfer coefficient of the heat transferred from the suction plate 2 to the wafer W (heat transfer coefficient of the heat transfer between the wafer W and the suction plate 2) by regulating the pressure of the heat transfer gas. FIG. 2 illustrates the relationship between the pressure of the heat transfer gas supplied between the wafer W and the suction plate 2, and the heat transfer coefficient of the heat transferred between the wafer W and the suction plate 2.

Specifically, the pressure regulator 43 includes a pressure sensor and a pressure control valve. A controller 11 in the control device COM then controls the degree by which the pressure control valve is opened.

The wafer temperature control device 100 includes a nearby temperature sensor 5 that measures the nearby temperature of the wafer W. The nearby temperature sensor 5 is provided on the back surface of the base plate 32a, and measures the temperature of the base plate 32a as the nearby temperature of the wafer W. The nearby temperature sensor 5 according to this embodiment is an infrared temperature sensor, for example. The nearby temperature sensor 5 may also measure the temperature of the suction plate 2 as the nearby temperature of the wafer W.

2. Wafer Temperature Control System

The wafer temperature control device 100 also includes the control device COM that at least controls the operations of the temperature regulator 3 and the pressure regulator 43.

Figure 3:
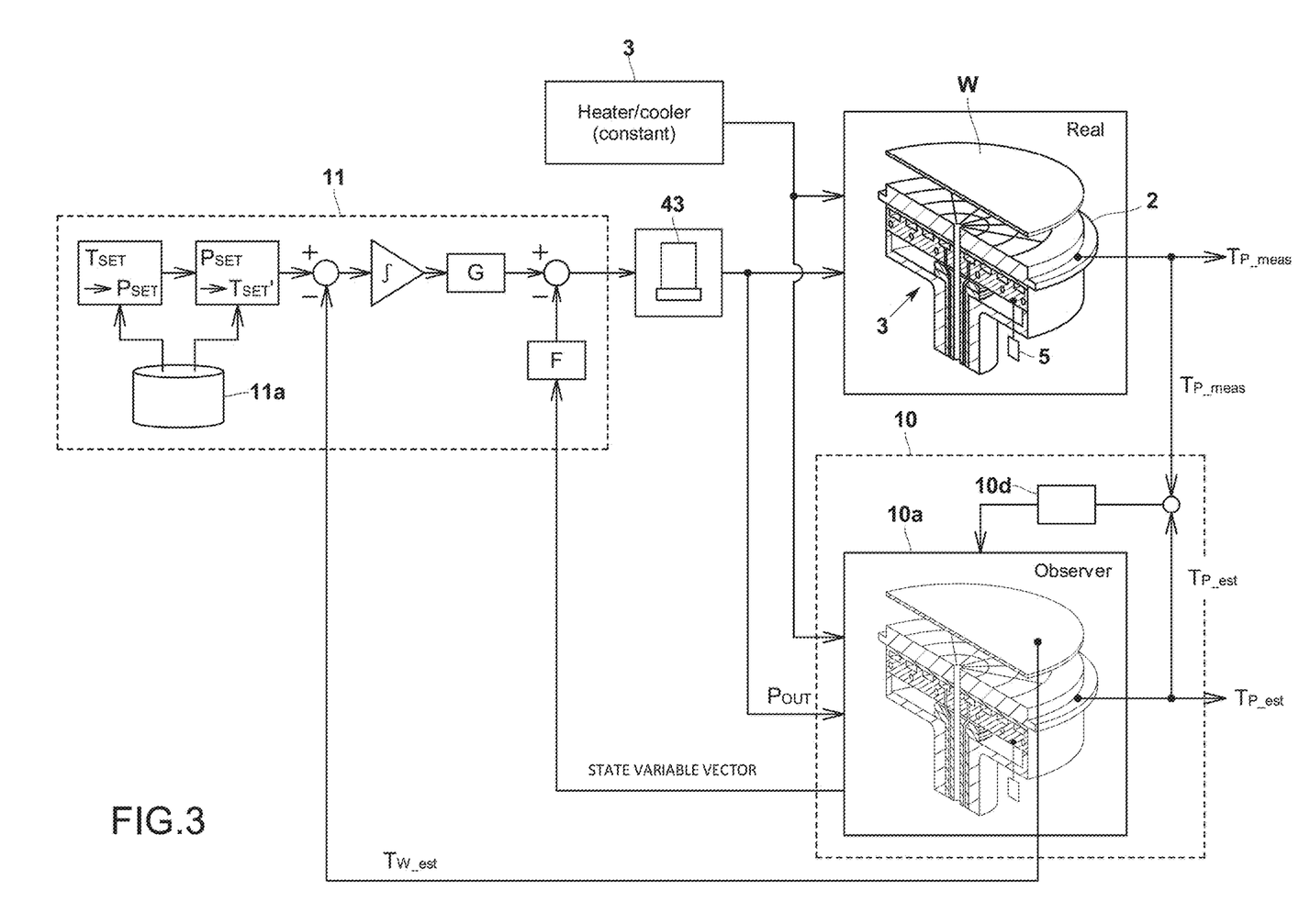
FIG. 3 is a diagram schematically illustrating a wafer temperature control system according to the embodiment.
Figure 4:
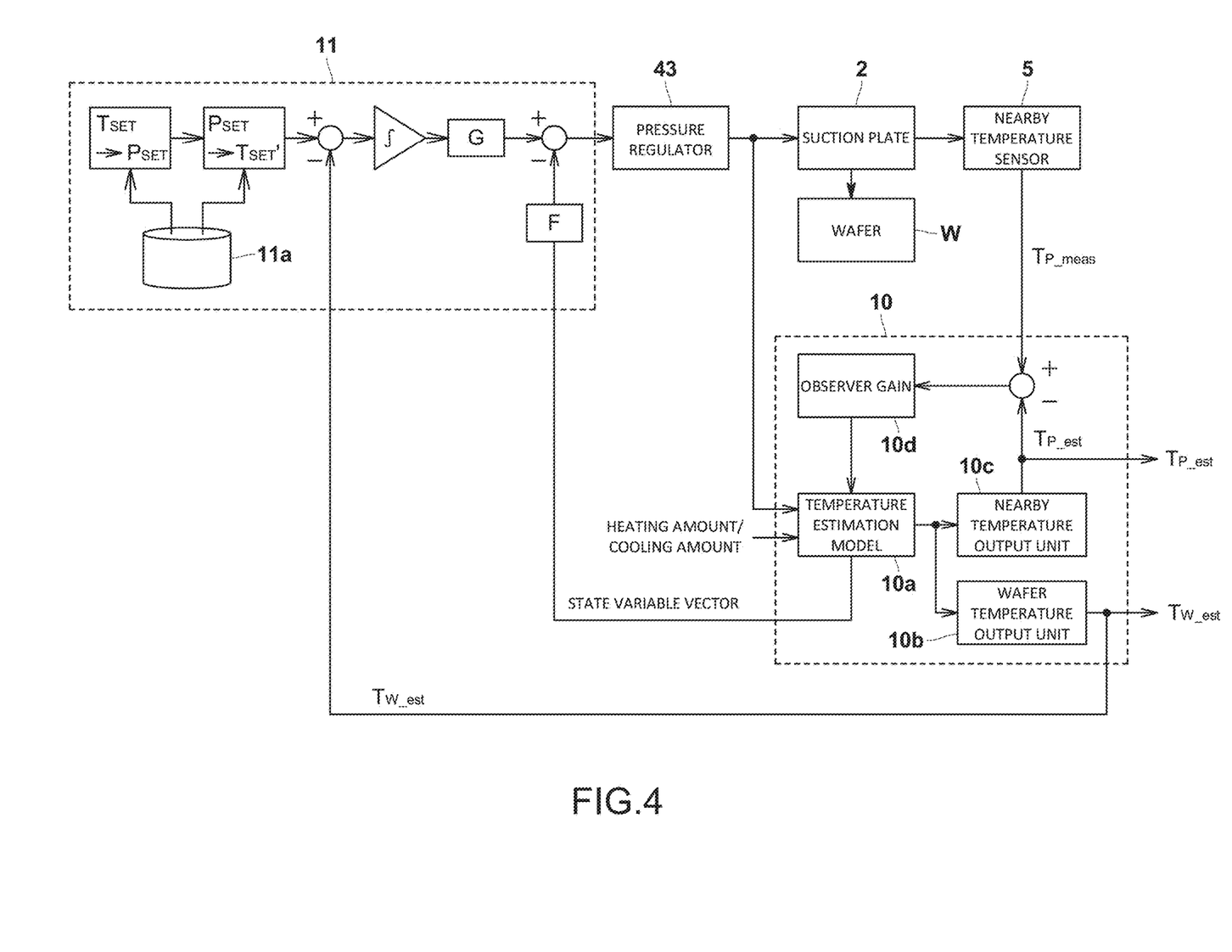
FIG. 4 is a functional block diagram of the wafer control device according to the embodiment.

Note that the control device COM is what is called a computer including a CPU, a memory, an A/D converter, a D/A converter, and various input/output devices. The control device COM then executes a wafer temperature control program stored in the memory, to cause various devices to cooperate with one another, together forming a wafer temperature control system, as illustrated in FIGS. 3 and 4.

To begin with, an outline of the wafer temperature control system according to this embodiment will now be explained, with reference to FIG. 3.

In this embodiment, regardless of an estimated wafer temperature $T_{W\_est}$ estimated by a temperature estimation observer 10 and a nearby temperature $T_{P\_meas}$ measured by the nearby temperature sensor 5, fixed power is supplied to each heater electrode 31a of a heater 31, to control the degree by which the control valve 32e of the cooler 32 is opened to be constant. In other words, the manipulated heating variable and the manipulated cooling variable remain fixed during the operation, and the amount by which the temperature is regulated per unit time by the temperature regulator 3 is controlled to be constant.

By contrast, the pressure regulator 43 changes the input manipulated pressure variable sequentially, based on the estimated wafer temperature $T_{W\_est}$ estimated by the temperature estimation observer 10 and the nearby temperature $T_{P\_meas}$ measured by the nearby temperature sensor 5.

Specifically, the control device COM uses the temperature estimation observer 10 to estimate the temperature of the wafer W based on the nearby temperature $T_{P\_meas}$ measured by the nearby temperature sensor 5. The control device COM then sends the estimated wafer temperature $T_{W\_est}$, as a feedback, to control the pressure regulator 43 to cause the estimated wafer temperature $T_{W\_est}$ to follow the temperature setting $T_{SET}$.

More specifically, as illustrated in FIG. 3, the control device COM includes the temperature estimation observer 10 configured to estimate the temperature of the wafer W, and the controller 11 that feedback-controls the pressure regulator 43 based on the temperature setting $T_{SET}$ of the wafer W and the estimated wafer temperature $T_{W\_est}$ estimated by the temperature estimation observer 10.

<2-1. Temperature Estimation Observer 10>

The temperature estimation observer 10 simulates at least a thermal behavior of the system, and estimates the temperature of the wafer W that cannot be measured directly.

Specifically, the temperature estimation observer 10 is configured to output an estimated wafer temperature $T_{W\_est}$ that is an estimation of the temperature $T_W$ of the wafer W, and an estimated nearby temperature $T_{P\_est}$ that is an estimation of the nearby temperature $T_P$, based on the nearby temperature $T_{P\_meas}$ measured by the nearby temperature sensor 5 and the pressure $P_{OUT}$ output from the pressure regulator 43.

Specifically, as illustrated in FIG. 4, the temperature estimation observer 10 includes a temperature estimation model 10a that is a linear state-space model having the temperature $T_W$ of the wafer w and the nearby temperature TP as output variables, a wafer temperature output unit 10b that outputs the estimated wafer temperature $T_{W\_est}$ estimated based on the temperature estimation model 10a, an nearby temperature output unit 10c that outputs the estimated nearby temperature $T_{P\_est}$ estimated based on the temperature estimation model 10a, and an observer gain 10d.

The temperature estimation observer 10 is configured to give a feedback of a value resultant of multiplying the observer gain 10d to a deviation between the estimated nearby temperature $T_{P\_est}$ output from the nearby temperature output unit 10c and the nearby temperature $T_{P\_meas}$ measured by the nearby temperature sensor 5, to the temperature estimation model 10a.

The temperature estimation model 10a is a modelling of thermal conductions related to the suction plate 2 and the wafer W themselves, and heat transfer between the suction plate 2 and the wafer W, for example.

Figure 5:
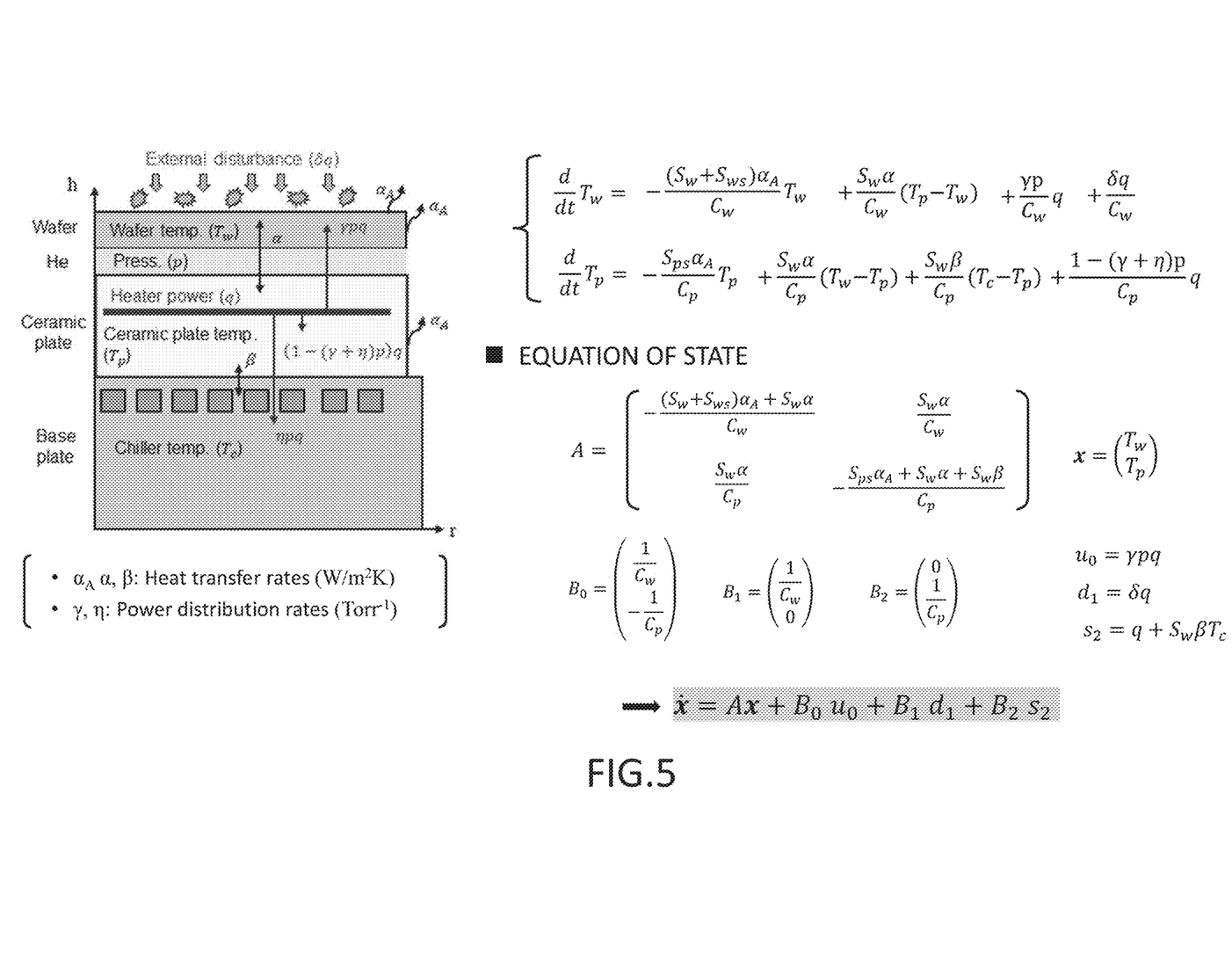
FIG. 5 is a schematic diagram illustrating a state-space model of the wafer temperature control device according to the embodiment.

The temperature estimation model 10a is a state-space model at least including a linear relationship between the temperature $T_W$ of the wafer W and the pressure $P_{HG}$ of the heat transfer gas. An example of the state-space model is illustrated in FIG. 5. The input variables of the temperature estimation model 10a according to this embodiment include not only a pressure $P_{OUT}$ (p in FIG. 5) output from the pressure regulator 43, but also the amount q heated by the heater 31 or the amount cooled by the cooler 32 (the temperature $T_c$ of the base plate 32a).

Specifically, the temperature estimation model 10a receives an input variable vector including a pressure $P_{OUT}$ and the like output from the pressure regulator 43, and outputs a state variable vector including the estimated wafer temperature $T_{W\_est}$ and the estimated nearby temperature $T_{P\_est}$.

The wafer temperature output unit 10b extracts the estimated wafer temperature $T_{W\_est}$ from the output of the temperature estimation model 10a, and outputs the estimated wafer temperature $T_{W\_est}$ to the controller 11.

The nearby temperature output unit 10c extracts the estimated nearby temperature $T_{P\_est}$ from the output of the temperature estimation model 10a and outputs the estimated nearby temperature $T_{P\_est}$. A deviation between the output estimated nearby temperature $T_{P\_est}$ and the nearby temperature $T_{P\_meas}$ measured by the nearby temperature sensor 5 is calculated and input to the observer gain 10d.

<2-2. Controller 11>

The controller 11 controls the pressure regulator 43 configured to regulate the pressure $P_{HG}$ of the heat transfer gas based on the temperature setting $T_{SET}$ of the wafer W and the estimated wafer temperature $T_{W\_est}$ estimated by the temperature estimation observer 10.

Figure 6:
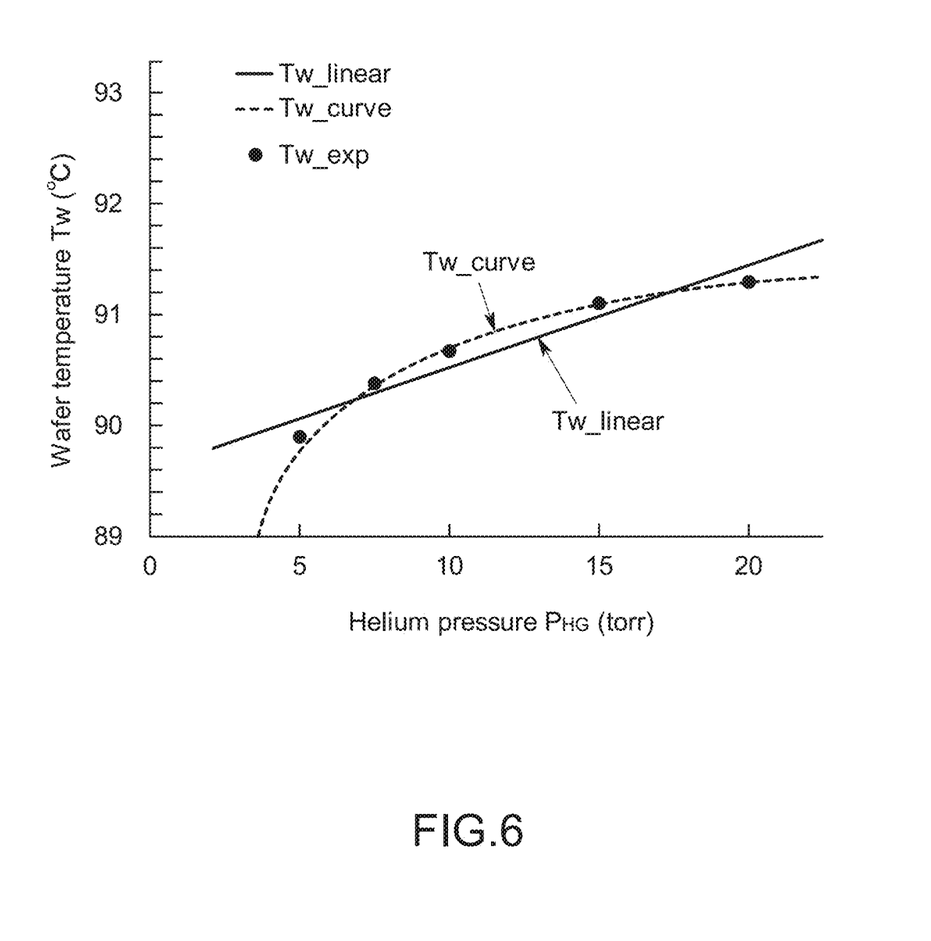
FIG. 6 is a graph illustrating a linear relationship (Tw_linear) and a non-linear relationship (Tw_curve) between the temperature $T_W$ of the wafer the pressure $P_{HG}$ of the heat transfer gas.

In the actual environment, as illustrated in FIG. 6, the temperature $T_W$ of the wafer W and the pressure $P_{HG}$ of the heat transfer gas has a non-linear relationship. By contrast, the temperature estimation observer 10 assumes that the behavior of an output (the temperature $T_W$ of the wafer W) with respect to the manipulated pressure variable has linearity, and considers that there is a linear relationship between the temperature $T_W$ of the wafer W and the pressure $P_{HG}$ of the heat transfer gas.

Therefore, as illustrated in FIGS. 3 and 4, the controller 11 according to this embodiment is configured to correct the temperature setting $T_{SET}$ using a non-linear relationship between the temperature $T_W$ of the wafer W and the pressure $P_{HG}$ of the heat transfer gas acquired in advance, and to control the manipulated pressure variable so as to reduce a temperature deviation between a corrected temperature setting $T_{SET}'$ and the estimated wafer temperature $T_{W\_est}$.

Specifically, the controller 11 includes a relationship data storage unit 11a that stores therein nonlinear relationship data representing a nonlinear relationship between the wafer temperature $T_W$ and the pressure $P_{HG}$ of the heat transfer gas acquired in advance, and linear relationship data representing a linear relationship between the temperature $T_W$ of the wafer W and the pressure $P_{HG}$ of the heat transfer gas used in the state-space model of the temperature estimation observer 10.

Figure 7:
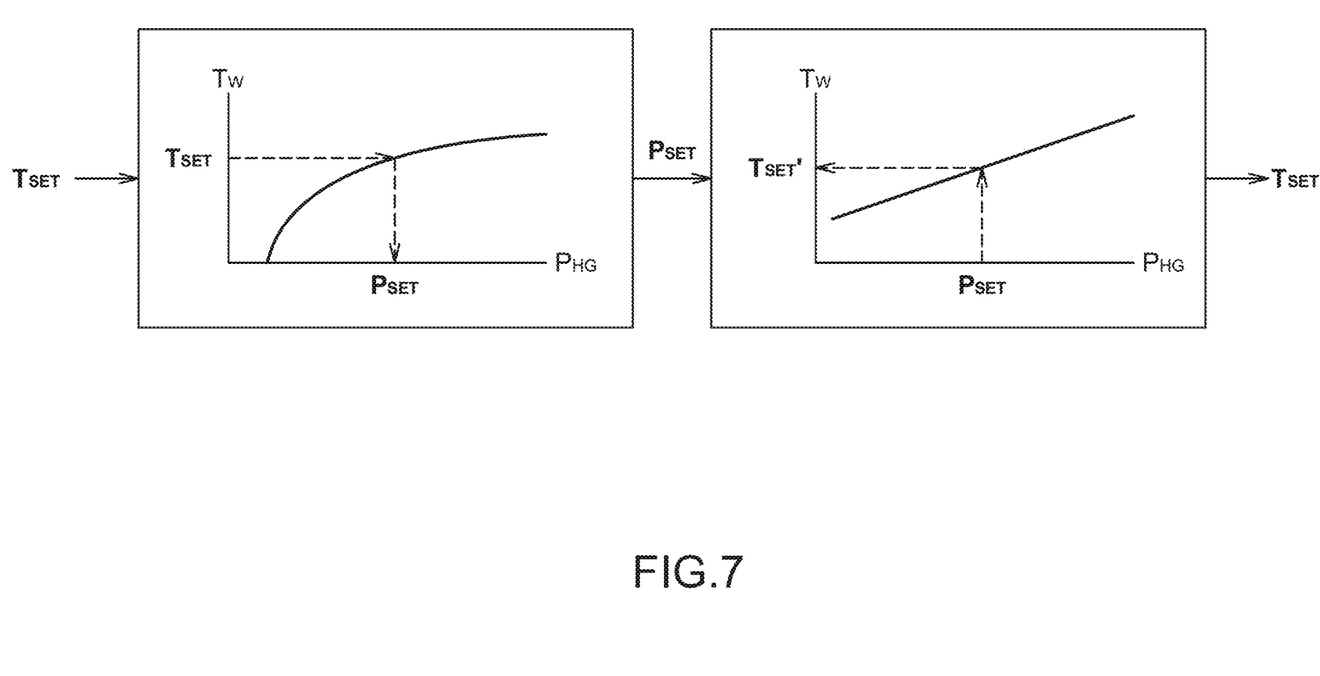
FIG. 7 is a schematic diagram illustrating a method of correcting a temperature setting of a controller according to the embodiment.

Then, as illustrated in FIG. 7, The controller 11 then obtains a converted pressure $P_{SET}$ nonlinearly corresponding to the temperature setting $T_{SET}$, from the input temperature setting $T_{SET}$ and the nonlinear relationship data. The controller 11 also obtains a converted temperature linearly corresponding to the converted pressure $P_{SET}$, from the converted pressure $P_{SET}$ and the linear relationship data, and establishes the converted temperature as the corrected temperature setting $T_{SET}'$.

The controller 11 then calculates an integral, by multiplying a gain K to the temperature deviation between the corrected temperature setting $T_{SET}'$ and the estimated wafer temperature $T_{W\_est}$ estimated by the temperature estimation observer 10. The controller 11 also calculates a deviation between the calculated integral and a value obtained by multiplying a predetermined state feedback gain F to the state variable vector, and inputs the deviation to the pressure regulator 43 as the manipulated pressure variable.

Figure 8A:
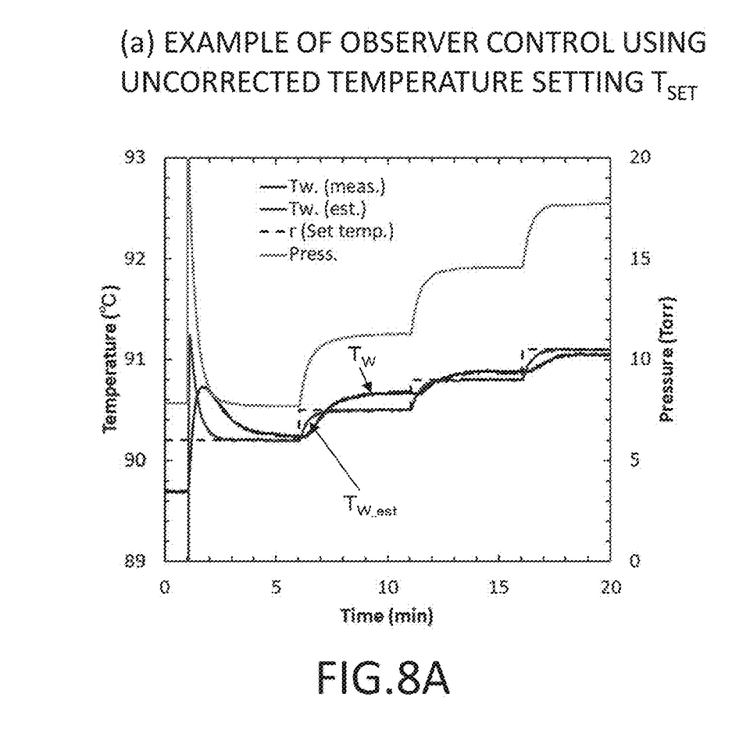
FIG. 8A is an experimental result of the wafer temperature control device according to the embodiment, when the observer is controlled using an uncorrected temperature setting $T_{SET}$.
Figure 8B:
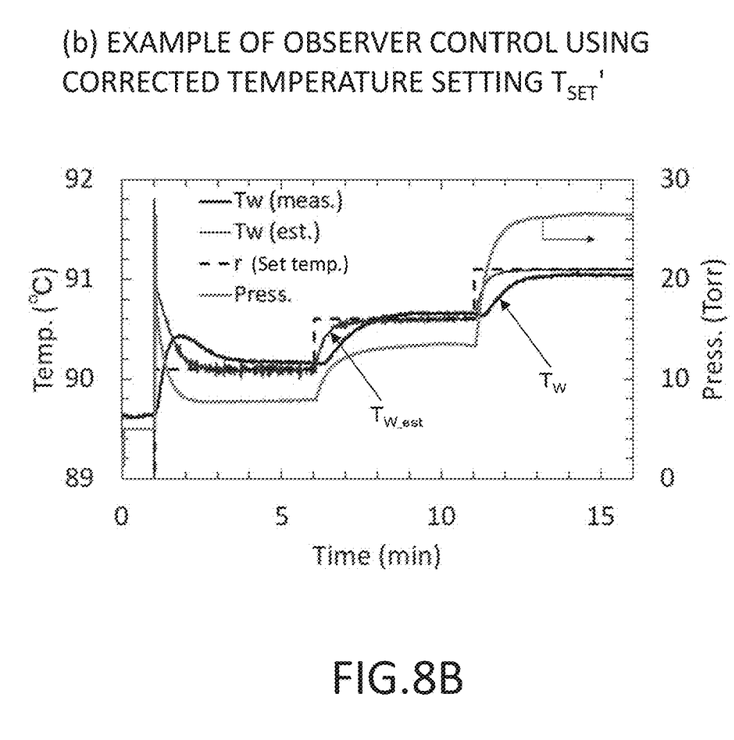
FIG. 8B is an experimental result of the wafer temperature control device according to the embodiment, when the observer is controlled using a corrected temperature setting $T_{SET}'$.

FIGS. 8A and 8B illustrate results of experiments in which the controller has performed the observer control using the uncorrected temperature setting $T_{SET}$, and in which the controller 11 has performed the observer control using the corrected temperature setting $T_{SET}'$, respectively. FIG. 8A illustrates a result of the observer control using the uncorrected temperature setting $T_{SET}$, and FIG. 8B illustrates a result of the observer control using the corrected temperature setting $T_{SET}'$. When the uncorrected temperature setting $T_{SET}$ is used, there is an observable error between the temperature $T_W$ of the wafer W and the estimated wafer temperature $T_{W\_est}$ by the temperature estimation observer 10. By contrast, when the corrected temperature setting $T_{SET}'$ is used, the error between the temperature $T_W$ of the wafer W and the estimated wafer temperature $T_{W\_est}$ by the temperature estimation observer 10 decreased.

3. Advantageous Effects Achieved by Present Embodiment

As described above, according to the wafer temperature control device 100 according to this embodiment, the temperature $T_W$ of the wafer W is estimated using the temperature estimation observer 10 configured to use the pressure $P_{HG}$ of the heat transfer gas as an input variable. Therefore, the temperature $T_W$ of the wafer W can be estimated with sufficient accuracy. In addition, because the manipulated pressure variable input to the pressure regulator 43 configured to regulate the pressure $P_{HG}$ of the heat transfer gas is controlled based on the temperature setting $T_{SET}$ of the wafer W and the estimated wafer temperature $T_{W\_est}$ estimated by the temperature estimation observer 10, the temperature of the wafer can be controlled to the target temperature highly accurately.

Although it is conceivable to control the manipulated cooling variable or the manipulated heating variable input to the cooler 32 or the heater 31 for regulating the temperature of the suction plate 2, it is difficult to fine-tune the temperature $T_W$ of the wafer W. It is easier to fine-tune the temperature $T_W$ of the wafer W by controlling the manipulated pressure variable input to the pressure regulator 43, as in this embodiment.

In particular, in this embodiment, the controller 11 corrects the temperature setting $T_{SET}$ using the nonlinear relationship between the temperature $T_W$ of the wafer W and the pressure $P_{HG}$ of the heat transfer gas, and controls the manipulated pressure variable so as to reduce the temperature deviation between the corrected temperature setting $T_{SET}'$ and the estimated wafer temperature $T_{W\_est}$. Therefore, it is possible to reduce an estimation error of the estimated wafer temperature $T_{W\_est}$ estimated by the temperature estimation observer 10, and the temperature Tw of the wafer W can be controlled to the target temperature highly accurately.

4. Other Embodiments

Figure 9:
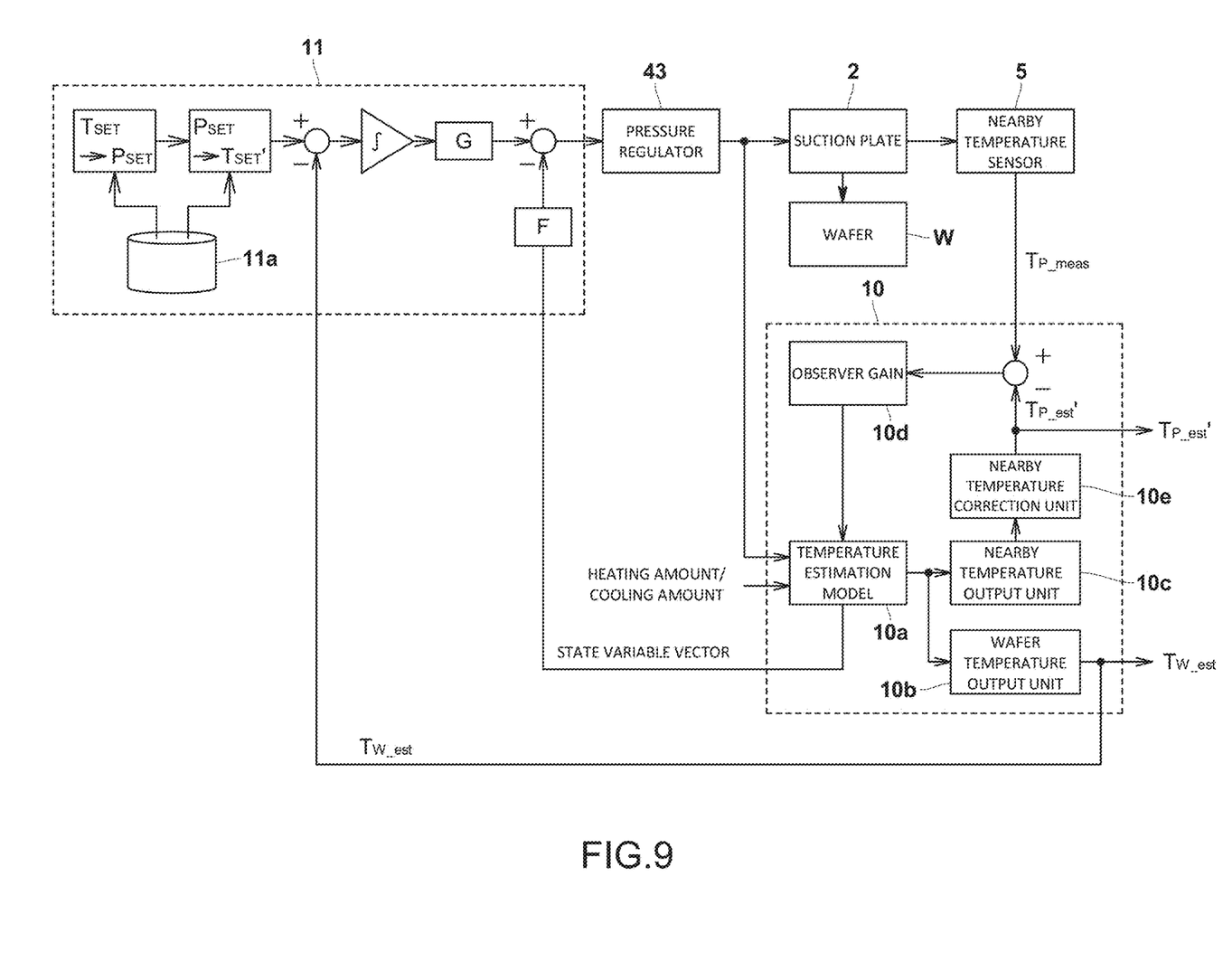
FIG. 9 is a functional block diagram of a wafer control device according to a modification of the embodiment.

As illustrated in FIG. 9, the temperature estimation observer according to the embodiment may also include a nearby temperature correction unit 10e that corrects the estimated nearby temperature $T_{P\_est}$ output from the nearby temperature output unit 10c, considering the nonlinear characteristics of the temperature of the suction plate 2, and be configured the temperature estimation model 10a is configured to receive a value obtained by multiplying the observer gain 10d to a deviation between the corrected estimated nearby temperature $T_{P\_est}'$ output from the nearby temperature correction unit 10e and the nearby temperature $T_P$ measured by the nearby temperature sensor 5, or to a value calculated from the deviation, as a feedback.

In the above embodiment, the temperature of the suction plate 2 is regulated to remain constant, but the wafer temperature control device 100 may also be configured to change the temperature of the suction plate 2. In such a case, the temperature estimation observer 10 may include a temperature estimation model 10a corresponding to the temperature of the suction plate 2 having its temperature regulated.

The temperature estimation observer 10 may also include an observer integrator that calculates an integral of the deviations between the estimated nearby temperatures $T_{P\_est}$ output from the nearby temperature output unit 10c and the nearby temperatures $T_P$ measured by the nearby temperature sensor 5, and to give a value obtained by multiplying the observer gain 10d to the integral output from the observer integrator, as a feedback to the temperature estimation model 10a.

In such a case, it is possible to give a value obtained by multiplying a proportional observer gain to the deviation between the estimated nearby temperature $T_{P\_est}$ and the nearby temperature $T_P$ to the temperature estimation model 10a as a feedback, and to send a value obtained by multiplying an integral observer gain to the integral of the deviation to the temperature estimation model 10a as a feedback. It is also possible to send only the value obtained by multiplying the integral observer gain to the integral of the deviation to the temperature estimation model 10a.

Although the cooler and the heater are controlled to keep their output constant, but a manipulated cooling variable or a manipulated heating variable may be changed via output feedback control or state feedback control of the cooler or the heater.

The temperature estimation observer may be configured as a Kalman filter, taking the effect of disturbance into consideration. As to a method for setting the Kalman gain instead of the observer gain, various existing methods may be used.

The heater 31 in the embodiment described above can create a distribution of the temperature of the suction plate 2 using a plurality of heater electrodes 31a. For example, the heater 31 can heat the central portion and the outer peripheral portion of the suction plate 2 by different degrees. Furthermore, the heater 31 can heat a substantially C-shaped large region and the remaining small region of the outer periphery, by different degrees. In other words, three heating regions are set to the suction plate 2, whereby a temperature distribution is formed in the suction plate 2. The cooler 32 may also be configured to create three cooling regions on the surface of the base plate 32a in a manner corresponding to the three heating regions of the suction plate 2.

The heating or cooling regions of the wafer W and the suction plate 2 are not limited to those divided into three, and the wafer W and the suction plate 2 may be divided into a larger number of regions, or into two regions. In addition, the entire wafer W or suction plate 2 may be handled as one temperature without setting a region. It is also possible for the suction plate 2 not to have a suction function, and may be a plate on which the wafer W is simply placed.

The present invention described above may have an embodiment in which the temperature setting for the wafer is corrected using a non-linear relationship between the temperature of the wafer and the pressure of the heat transfer gas, but may also have an embodiment in which the temperature setting for the wafer is corrected using a non-linear relationship between the temperature of the wafer and the temperature of the temperature regulator.

Specifically, the temperature estimation observer 10 uses a state-space model in which the temperature $T_W$ of the wafer W and the temperature of the temperature regulator 3 have a linear relationship. In the example explained herein, the temperature estimation observer 10 uses a state-space model in which the temperature $T_W$ of the wafer W and the temperature of the heater 31 and/or the cooler 32 have a linear relationship. The controller 11 may then correct the temperature setting $T_{SET}$ using the non-linear relationship between the temperature $T_W$ of the wafer W and the temperature of the heater 31 and/or the cooler 32 acquired in advance, and control the manipulated temperature variable (manipulated heating variable and/or manipulated cooling variable) so as to reduce the temperature deviation between the corrected temperature setting $T_{SET}'$ and the estimated wafer temperature $T_W$ est.

The configuration of the cooler or the heater is not limited to that described above. For example, the cooler may be configured using a Peltier element, and the heater is not limited to the heater electrodes and may be configured to heat the wafer by emitting light.

The position measured by the nearby temperature sensor is not limited to the position described above, and may be another position. In short, a temperature that is likely to have some correlation or relationship with the wafer temperature may be measured as the nearby temperature. In addition, the controller is not limited to the infrared temperature sensor, and may be a thermocouple provided inside the plate, for example.

In addition, various modifications of the embodiments and combinations thereof may be made within the scope not deviating from the gist of the present invention.

LIST OF REFERENCE CHARACTERS 100 wafer temperature control device
2 suction plate (plate)
3 temperature regulator
31 heater
32 cooler
4 gas feed mechanism
43 pressure regulator
5 nearby temperature sensor
10 temperature estimation observer
10a temperature estimation model
10b wafer temperature output unit
10c nearby temperature output unit
10d observer gain
11 controller
d distance between wafer backside and ESC surface
G gain
h height
r radius
Tw_exp experimental value of wafer temperature
Tw.(meas) measurement value of wafer temperature
Tw.(est) estimated value of wafer temperature
r (Set temp) set temperature before correction
Press heat transfer gas pressure

What is claimed is:

1. A wafer temperature control device in which a wafer is placed on a plate having a temperature regulated, and that controls a temperature of the wafer by supplying a heat transfer gas between the plate and the wafer, the wafer temperature control device comprising:

a pressure regulator configured to regulate a pressure of the heat transfer gas;

a nearby temperature sensor configured to measure a temperature near the wafer;

a temperature estimation observer configured to estimate the temperature of the wafer based on a nearby temperature measured by the nearby temperature sensor, and a manipulated pressure variable input to the pressure regulator or a pressure regulated by the pressure regulator; and a controller configured to control the manipulated pressure variable based on a temperature setting for the wafer and an estimated wafer temperature estimated by the temperature estimation observer, wherein the temperature estimation observer is configured to use a state-space model in which the temperature of the wafer and the pressure of the heat transfer gas has a linear relationship, and the controller is configured to correct the temperature setting using a non-linear relationship between the temperature of the wafer and the pressure of the heat transfer gas, the non-linear relationship being acquired in advance, and to control the manipulated pressure variable so as to reduce a temperature deviation between a corrected temperature setting and the estimated wafer temperature.

2. The wafer temperature control device according to claim 1, wherein
the controller includes a relationship data storage unit that stores therein non-linear relationship data indicating the non-linear relationship between the temperature of the wafer and the pressure of the heat transfer gas, the non-linear relationship being acquired in advance, and linear relationship data indicating a linear relationship between the temperature of the wafer and the pressure of the heat transfer gas, the linear relationship being used in the state-space model of the temperature estimation observer, and
the controller is configured to obtain a converted pressure non-linearly corresponding to the temperature setting, from the temperature setting and the non-linear relationship data, to obtain a converted temperature linearly corresponding to the converted pressure, from the converted pressure and the linear relationship data, and to use the converted temperature as the corrected temperature setting.

3. The wafer temperature control device according to claim 1, wherein
the temperature estimation observer includes:
a temperature estimation model that is a linear state-space model having a temperature of the wafer and a nearby temperature as output variables;
a wafer temperature output unit configured to output an estimated wafer temperature estimated based on the temperature estimation model;
a nearby temperature output unit configured to output an estimated nearby temperature estimated based on the temperature estimation model; and
an observer gain, and
the temperature estimation model is configured to receive a value obtained by multiplying the observer gain to a deviation between the estimated nearby temperature output from the nearby temperature output unit and the nearby temperature measured by the nearby temperature sensor, or to a value calculated from the deviation, as a feedback.

4. The wafer temperature control device according to claim 1, wherein
the temperature estimation observer includes:
a temperature estimation model that is a linear state-space model having a temperature of the wafer and a nearby temperature as output variables;
a wafer temperature output unit configured to output an estimated wafer temperature estimated based on the temperature estimation model;
a nearby temperature output unit configured to output an estimated nearby temperature estimated based on the temperature estimation model;
a nearby temperature correction unit configured to correct an estimated nearby temperature output from the nearby temperature output unit, in consideration of a non-linear characteristic of a temperature of the plate; and
an observer gain, and
the temperature estimation model is configured to receive a value obtained by multiplying the observer gain to a deviation between the corrected estimated nearby temperature output from the nearby temperature correction unit and the nearby temperature measured by the nearby temperature sensor, or to a value calculated from the deviation, as a feedback.

5. The wafer temperature control device according to claim 3, wherein the temperature estimation observer includes a temperature estimation model corresponding to the temperature of the plate having the temperature regulated.

6. A wafer temperature control method for controlling a temperature of a wafer by placing the wafer on a plate having a temperature regulated and supplying a heat transfer gas between the plate and the wafer, the method comprising:
causing a pressure regulator to regulate a pressure of the heat transfer gas;
causing a nearby temperature sensor to measure a temperature near the wafer;
causing a temperature estimation observer to estimate the temperature of the wafer based on a nearby temperature measured by the nearby temperature sensor and a manipulated pressure variable input to the pressure regulator or a pressure regulated by the pressure regulator; and
controlling the manipulated pressure variable based on a temperature setting for the wafer and an estimated wafer temperature estimated by the temperature estimation observer, wherein
the temperature estimation observer is configured to use a state-space model in which the temperature of the wafer and the pressure of the heat transfer gas has a linear relationship, and
the temperature setting is corrected using a non-linear relationship between the temperature of the wafer and the pressure of the heat transfer gas, the non-linear relationship being acquired in advance, and the manipulated pressure variable is controlled so as to reduce a temperature deviation between a corrected temperature setting and the estimated wafer temperature.

7. A wafer temperature control device in which a wafer is placed on a plate having a temperature regulated, and that controls a temperature of the wafer by supplying a heat transfer gas between the plate and the wafer, the wafer temperature control device including: a pressure regulator configured to regulate a pressure of a heat transfer gas; and a nearby temperature sensor configured to measure a nearby temperature of a wafer, the wafer temperature control device including a computer configured to execute a wafer temperature control program stored in memory to provide the computer with functions of:
a temperature estimation observer configured to estimate a temperature of the wafer based on a nearby temperature measured by the nearby temperature sensor and a manipulated pressure variable input to the pressure regulator or a pressure regulated by the pressure regulator; and
a function as a controller configured to control the manipulated pressure variable based on a temperature setting for the wafer and an estimated wafer temperature estimated by the temperature estimation observer, wherein
the temperature estimation observer is configured to use a state-space model in which the temperature of the wafer and the pressure of the heat transfer gas has a linear relationship, and
the temperature setting is corrected using a non-linear relationship between the temperature of the wafer and the pressure of the heat transfer gas, the non-linear relationship being acquired in advance, and the manipulated pressure variable is controlled so as to reduce a temperature deviation between a corrected temperature setting and the estimated wafer temperature.

8. A wafer temperature control device comprising:
a temperature regulator configured to regulate a temperature of a wafer according to an input manipulated temperature variable;
a nearby temperature sensor configured to measure a nearby temperature of the wafer;
a temperature estimation observer configured to estimate the temperature of the wafer based on the nearby temperature measured by the nearby temperature sensor and the manipulated temperature variable input to the temperature regulator or a temperature of the temperature regulator; and
a controller configured to control the manipulated temperature variable based on a temperature setting for the wafer and the estimated wafer temperature estimated by the temperature estimation observer, wherein
the temperature estimation observer is configured to use a state-space model in which the temperature of the wafer and the temperature of the temperature regulator has a linear relationship, and
the controller is configured to correct the temperature setting using a non-linear relationship between the temperature of the wafer and the temperature of the temperature regulator, the non-linear relationship having been acquired in advance, and to control the temperature manipulated variable so as to reduce a temperature deviation between a corrected temperature setting and the estimated wafer temperature.

* * * * *